D. F. FETTER.
Horseshoe.
No. 206,939.  Patented Aug. 13, 1878.
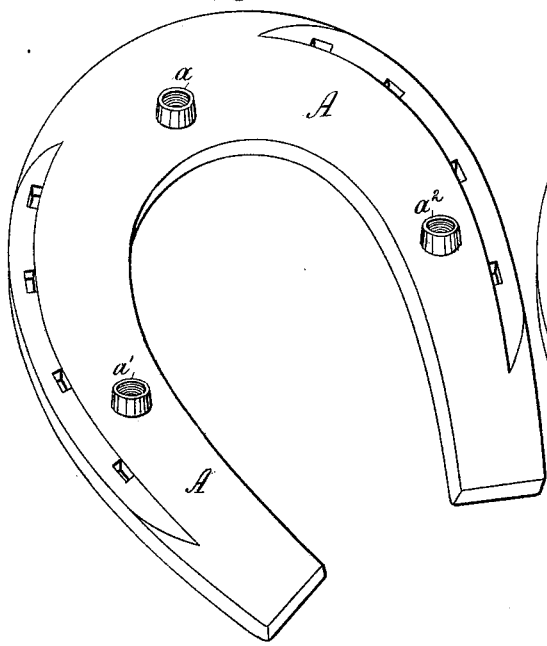
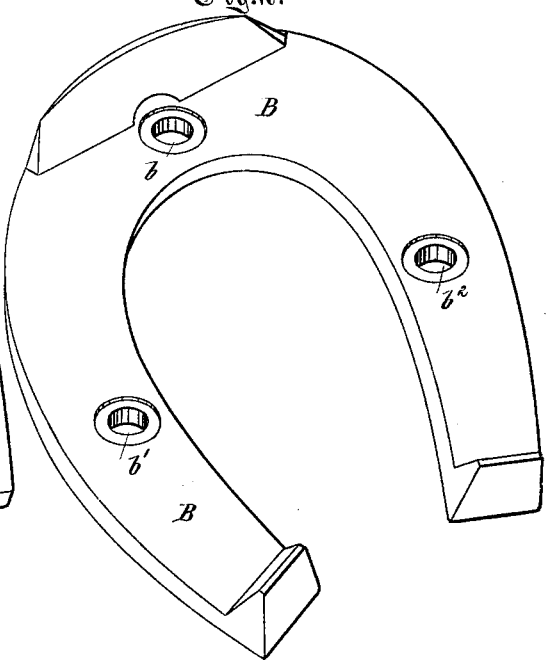
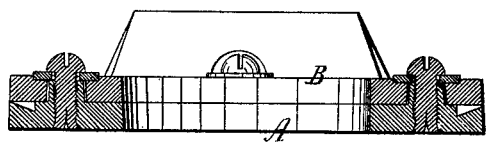
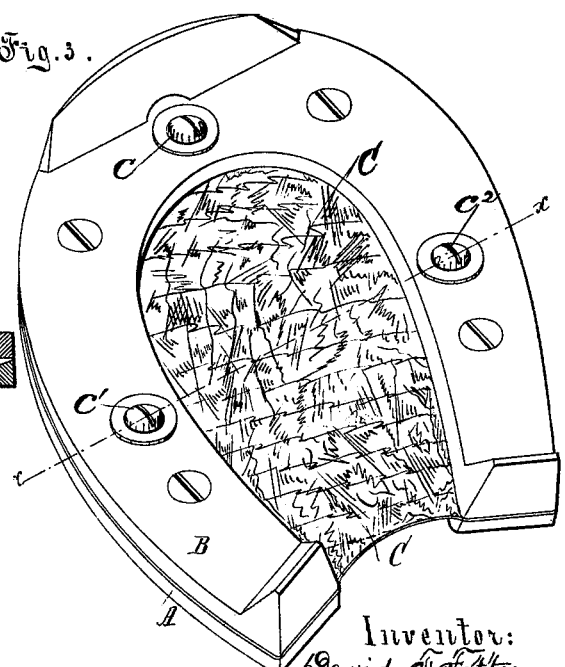
Witnesses:
Theodore L. Hosler
B. S. Clark
Inventor:
David F. Fetter
By J. Fitch
his attorney

UNITED STATES PATENT OFFICE.

DAVID F. FETTER, OF NEW YORK, N. Y.

IMPROVEMENT IN HORSESHOES.

Specification forming part of Letters Patent No. 206,939, dated August 13, 1878; application filed February 4, 1878.

*To all whom it may concern:*

Be it known that I, DAVID F. FETTER, of the city of New York, State of New York, have invented a new and useful Improvement in Horseshoes, of which the following is a specification, reference being had to the accompanying drawings, forming part of the same.

The horseshoe containing my improvements I denominate a "duplex horseshoe," the same being made in two parts, one of which is designed to be nailed to the hoof of the horse and the other to be secured to the first part, so as to be detached therefrom without removing the said first part from the hoof, by means of studs projecting from the inner part of the shoe, through holes in the outer part, and screw bolts or pins working in screw-holes made longitudinally through said studs.

Figure 1 is an upper-face perspective view of the part of the shoe designed to be nailed to the hoof of the horse. Fig. 2 is a similar view of the part designed to be secured to, so as to be detachable from, the first-named part. Fig. 3 is a similar view of the complete shoe, showing the two parts secured together, also with an apron or guard formed of canvas, rubber cloth, or some other suitable material interposed between the parts of the shoe and spread over the sole of the hoof; and Fig. 4 is a cross-section cut on line $x\ x$ of Fig. 3.

A represents the part of the shoe designed to be nailed to the foot of the horse. It is similar to the ordinary shoe without calks, except that it may be somewhat lighter, with nail-holes and creases for the nail-heads.. In this shoe are fixed studs, preferably three or more, $a\ a^1\ a^2$. Holes are made through the studs and the body of the part A, which are tapped with a screw-thread.

B represents the other part of the shoe, which is made to conform in shape accurately to A, and may be provided with calks. It is also similar to an ordinary horseshoe, except that it has no nail-holes, and of course no crease for the nail-heads, on its outer face. It should, however, have creases on the under face, corresponding to the creases in A, to receive the heads of the nails, if they should project at all above the general face of A. It is provided with holes $b\ b^1\ b^2$, into which the studs in A may snugly fit.

The part A is first nailed to the foot of the horse in the ordinary way. The part B is then placed upon A, the holes $b\ b^1\ b^2$ fitting upon the studs $a\ a^1\ a^2$, respectively, and secured thereto by screws, as shown in Fig. 4.

These screws $c\ c'\ c''$ may have heads broad enough to extend beyond the rim of the studs, or washers may be used, as shown. If the latter, a countersink may be made on the face of B to receive the washers. In order to prevent the screws from turning back and becoming loose, the lower ends of the holes $a\ a^1\ a^2$ may be reamed out a little, and the screws slit at their ends, and the two parts formed thereby bent outward slightly, so as to spring out into the countersink made by the reaming.

With this duplex shoe an apron or guard, C, for the sole of the horse's foot, may be conveniently applied. This may be done by cutting out a piece of canvas, rubber, or other suitable material the shape of the shoe, and after the part A is nailed to the heel lay the guard upon the said part and screw the part B down upon it. It will thus be secured firmly between the two.

This guard will be useful to prevent the balling of the horses' feet by snow, and as a protection for tender feet at all times.

I am aware that duplex horseshoes have been made the two parts of which have been secured together by rivets, by screws, by bolts; also by means of studs fastened in the inner plate, passing through holes in the outer plate, male screw-threads being cut on the studs, and headed female screws or threaded sleeves being used on said studs. I disclaim such devices, and limit my claim to the specific devices herein described, and shown in the drawing.

There are obvious advantages in such devices over those heretofore used. When the inner plate is used as the nut, with a common screw-bolt passing through the outer plate, the screw has a slender hold, because of the thinness of the nut; and when a threaded sleeve is used on a male screw-stud, the threads of the screw are exposed to injury. By my improvement both of these objections are obviated, and also the screw made more secure by enabling the head to be turned down firmly against the end of the stud.

What I claim as my invention, and desire to secure by Letters Patent, is—

The combination, in a duplex horseshoe, of the two plates A and B, the hollow female screw-studs $a\ a^1\ a^2$, and the headed male screws $c\ c^1\ c^2$, all constructed to operate as and for the purpose described.

Witness my hand this 1st day of February, 1878.

DAVID F. FETTER.

Witnesses:
  THEODORE G. HOSTER,
  B. S. CLARK.